(12) United States Patent
McCullough et al.

(10) Patent No.: US 8,886,896 B2
(45) Date of Patent: Nov. 11, 2014

(54) STORAGE FORMAT FOR MEDIA STREAMS

(75) Inventors: Wesley McCullough, San Francisco, CA (US); Asa Whillock, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1187 days.

(21) Appl. No.: 12/610,251

(22) Filed: Oct. 30, 2009

(65) Prior Publication Data

US 2013/0212342 A1 Aug. 15, 2013

(51) Int. Cl.
*G06F 12/00* (2006.01)
*G06F 3/00* (2006.01)
*G06F 12/02* (2006.01)
*G06F 3/06* (2006.01)

(52) U.S. Cl.
CPC ............ *G06F 12/0246* (2013.01); *G06F 3/067* (2013.01)
USPC ....................................................... 711/156

(58) Field of Classification Search
USPC ....................................................... 711/156
See application file for complete search history.

(56) References Cited

U.S. PATENT DOCUMENTS

| | | | |
|---|---|---|---|
| 7,110,664 B2 * | 9/2006 | Yogeshwar et al. | 386/328 |
| 7,461,214 B2 * | 12/2008 | Arulambalam et al. | 711/150 |
| 2007/0162568 A1 * | 7/2007 | Gupta et al. | 709/219 |
| 2008/0247732 A1 * | 10/2008 | Mae et al. | 386/95 |
| 2008/0301256 A1 * | 12/2008 | McWilliams et al. | 709/214 |

OTHER PUBLICATIONS

International Standard; ISO/IEC 14496-12; Information Technology—Coding of Audio-Visual Objects, "Part 12: ISO Base Media File Format", Second Edition, Apr. 4, 2005.
International Telecommunications Union; Telecommunication Standardization Sector of ITU, "Series H: Audiovisual and Multimedia Systems; Infrastructure of Audiovisual Services—Coding of Moving Video", Recommendation ITU-T H2.64, Mar. 2009.
Adobe Systems Inc., "Action Message Format—AMF 0", http://opensource.adobe.com/wiki/download/attachments/1114283/amf0_spec_121207.pdf, Oct. 10, 2009.
Tincan Video File Format, Sep. 14, 2009.

* cited by examiner

*Primary Examiner* — Aimee Li
*Assistant Examiner* — Craig Goldschmidt
(74) *Attorney, Agent, or Firm* — Finch & Maloney PLLC (57) ABSTRACT

Methods, systems, and apparatus, including computer programs encoded on a computer storage medium, for storing live media streams are disclosed. A storage format that can be used to record and then playback live streams including data-streams, audio-streams, video-streams, and other multi-media streams is also disclosed. The disclosed storage format is referred to as "raw".

17 Claims, 5 Drawing Sheets

STORAGE FORMAT FOR MEDIA STREAMS

BACKGROUND

This specification relates generally to techniques and systems for storing media streams, and specifically to a storage format for media streams.

Providers of online streaming content can offer their customers digital video recording (DVR) of various live media feeds. Examples of live media feeds are TV network programming or live events (concerts, ball games, etc.). A live media feed, such as the ones enumerated above, can be received by the online DVR provider and can be processed to generate a media streaming document. An often used document for storing audio and video streams has a container format and an MP4 extension, in accordance with the Moving Picture Experts Group-4 (MPEG-4) standard (e.g., ISO/IEC 14496-12). The generated media streaming document can be updated continuously during the duration of the live media event. Moreover, the generated media streaming document can be used to regenerate the received live media stream for streaming the regenerated media stream to one or more clients that requested the live media stream. Further, the regeneration of the media stream from the generated media streaming document can take place while the generated media streaming document is being updated during the live event transmission, and can take place after the completion of the live event. Such an online DVR application enables a client requesting the live stream to experience pausing or rewinding a "live" transmission.

SUMMARY

This specification describes technologies relating to storing a live media stream. A storage format that can be used to record and then playback live streams including data-streams, audio-streams, video-streams, and other multi-media streams is disclosed. The disclosed storage format is referred to as "raw".

One aspect of the subject matter described in this specification can be implemented in methods that include the actions of obtaining a media stream in a memory device of the data processing apparatus. The obtained media stream can be processed. The processing is performed in the memory device while obtaining the media stream. Further, the processing includes dividing the obtained media stream into a plurality of segments. The plurality of segments can be written into corresponding content files. Furthermore, a corresponding segment descriptor can be written for each of the plurality of segments in an index file to map time offsets of the plurality of segments to address space allocated to the plurality of segments. In addition, context messages corresponding to the obtained media stream can be written in a context file. The methods can further include storing the processed media stream including the content files, the index file and the context file in a file directory of a storage device coupled with the data processing apparatus. The storing is performed while processing the media stream. The file directory corresponds to the processed media stream, and the stored content files, the index file and the context file have a given hierarchy level within the file directory of the storage device.

These and other implementations can include one or more of the following features. Each of the plurality of segments can be written in a separate content file, and can include a corresponding plurality of messages. The separate content file corresponding to a segment can be named in accordance with an identifier of a first message in the segment. Alternatively, the plurality of segments can be written in corresponding content files such that a predetermined number of corresponding segments are written in each of the content files.

In some implementations, obtaining the media stream includes receiving the media stream from a media feed different from the data processing apparatus. The method further includes outputting the stored media stream. Outputting the stored media stream can occur while obtaining and processing the media stream. A request for at least a portion of the obtained media stream can be received from a media rendering device. The media rendering device is different from the data processing apparatus and from the media feed. The requested media stream can be generated from the processed media stream. And the generated media stream can be streamed to the media rendering device. In some implementations, outputting the stored media stream includes converting the stored media stream to a media streaming document in accordance with a container format. The converted media streaming document can be stored to the storage device.

Other implementations of this aspect include corresponding systems, apparatus, and computer programs, configured to perform the actions of the methods, encoded on computer storage devices.

According to another aspect, the described subject matter can also be implemented in a computer readable medium storing a file directory corresponding to a media stream. The media stream can be divided in a plurality of segments. Further, the file directory has a flat hierarchy and includes a plurality of content files corresponding to the plurality of segments of the media stream. Each of the plurality of content files includes corresponding segments of the media stream. The file directory also includes an index file including segment descriptors corresponding to the plurality of segments, respectively. A segment descriptor corresponding to a segment maps a time offset of the segment to address space allocated to the segment. In addition, the file directory includes a context file including context messages corresponding to the media stream. The computer readable medium also stores a software program including instructions that when executed by data processing apparatus cause the data processing apparatus to perform operations including parsing at least select files stored in the file directory corresponding to the media stream. Additional operations performed by the data processing apparatus include outputting at least a portion of the media stream based on information from the parsed files.

These and other implementations can include one or more of the following features. Each of the plurality of segments is stored in a separate content file and includes a corresponding plurality of messages. The index file includes a version descriptor identifier of the media stream, a count of segments in the media stream, and an array of segment descriptors. A segment descriptor includes a segment-start time offset and a segment-end time offset, and a first-message index of the segment and a last-message index of the segment. The segment descriptor further includes a name of the content file containing the segment, a starting byte of the segment's data within the content file, and the length of the segment's data within the content file.

In some implementations, the context messages included in the context file are grouped by media stream track. The track can include video and audio. A context message includes an identifier of the track corresponding the context message, and an index-identifier of the context message within the context file. The context message further includes a time offset corresponding the context message, and a context type to indicate whether the context message corresponds to a contextual period starting or ending with the time offset. The context message further includes a message type including audio and video, and a payload including one of video codec data, audio codec data, digital rights management data, user-defined meta data, and empty bytes. Within each track, the context messages are ordered by the index-identifier. The software program further includes instructions that when executed by the data processing apparatus cause the data processing apparatus to receive a request to stream the media stream starting from a given one of the plurality of segments of the media stream.

In some implementations, a content file can be identified, in the index file, to correspond to the given one of the plurality of segments of the media stream identifying. Context messages relating to the requested media stream can be selected from the context file. The requested media stream can be generated from at least the identified content file corresponding to the given one of the plurality of segments of the media stream, and based on the selected context messages. The received request can be for streaming the media stream from a given seek time. The software program further includes instructions that when executed by the data processing apparatus cause the data processing apparatus to identify, in the index file, a time offset range corresponding to the received seek time. A segment corresponding to the seek time can be selected, based on the identified time offset range. A content file corresponding to the identified segment can be identified in the index file. The received request can be for streaming a next-segment during play-through of the media stream. The software program further includes instructions that when executed by the data processing apparatus cause the data processing apparatus to identify, in the index file, an index of a first-message of the next-segment as an index of a last-message of a previously-streamed-segment plus one. Based on the identified index of the first-message of the next segment, a content file can be selected corresponding to the next-segment.

In some implementations, the software program further includes instructions that when executed by the data processing apparatus cause the data processing apparatus to receive a request to store information included in the file directory corresponding to the media stream to a media streaming document, in accordance with a container format. Further, the requested media streaming document can be generated, and the generated media streaming document can be stored to the computer readable medium.

According to another aspect, the described subject matter can also be implemented in a system including a media player device, and a data processing apparatus communicatively coupled with a media storage device and with the media player device. The data processing apparatus includes a processor in communication with a memory device. The processor is configured to perform operations including obtaining a video stream in the memory device. The processor is also configured to process the obtained video stream. The processing is performed in the memory device while obtaining the video stream. The processing includes dividing the obtained video stream into a plurality of segments. Additionally, the processing includes writing the plurality of segments into corresponding content files. In addition, the processing includes writing a corresponding segment descriptor for each of the plurality of segments in an index file to map time offsets of the plurality of segments to address space allocated to the plurality of segments. Finally, processing also includes writing context messages corresponding to the obtained video stream in a context file. The processor is further configured to store the processed video stream including the content files, the index file and the context file in a file directory of the storage device. The storing is performed while processing the video stream. Furthermore, the file directory has a flat hierarchy and corresponds to the processed video stream.

These and other implementations can include one or more of the following features. The data processing apparatus can include a server operable to interact with the media player device through a data communication network, and the media player device can be operable to interact with the server as a client. Additionally, the media player device includes a personal computer running a video player. To obtain the video stream, the processor can receive the video stream from a media feed. In addition, the processor can be further configured to perform outputting the stored media stream. The outputting of the stored video stream can be performed by the processor while obtaining and processing the video stream. The processor can be further configured to perform operations including receiving, from the media player device, a request for at least a portion of the obtained video stream. The requested video stream can be generated from the stored video stream. The generated video stream can be streamed to the media player device.

The subject matter described in this specification can be implemented so as to realize one or more of the following potential advantages. The technologies disclosed here can enable a media streaming server to record content during a live recording session, while keeping the recorded content in a readable state. The foregoing benefit facilitates development of efficient digital video recording (DVR) applications based on the disclosed technology. In addition, a media streaming server can employ the disclosed techniques and systems to efficiently manage per-stream memory overhead. In contrast to the MP4-based DVR solutions for which a processor stores various tables needed to map an MP4 document while the mapped MP4 document is being updated, the disclosed storage format keeps the stored media stream in separate files that are laid-out in parallel (under a flat hierarchy). Therefore, the separate files of the disclosed format can be updated independently, thus obviating the need for per-stream processing and memory overload relating to mapping of updates across files. This can facilitate DVR scalability, where the media streaming server can record a video stream received from a live feed, and simultaneously stream the stored video stream to a readily increasing number of subscribers.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The methods and systems disclosed in this specification enable storing live media streams. These methods can be implemented in server software for multimedia streaming, or an execution environment that provides services to programs that receive, store and stream media content for potentially improved online digital video recording.

Figure 1:
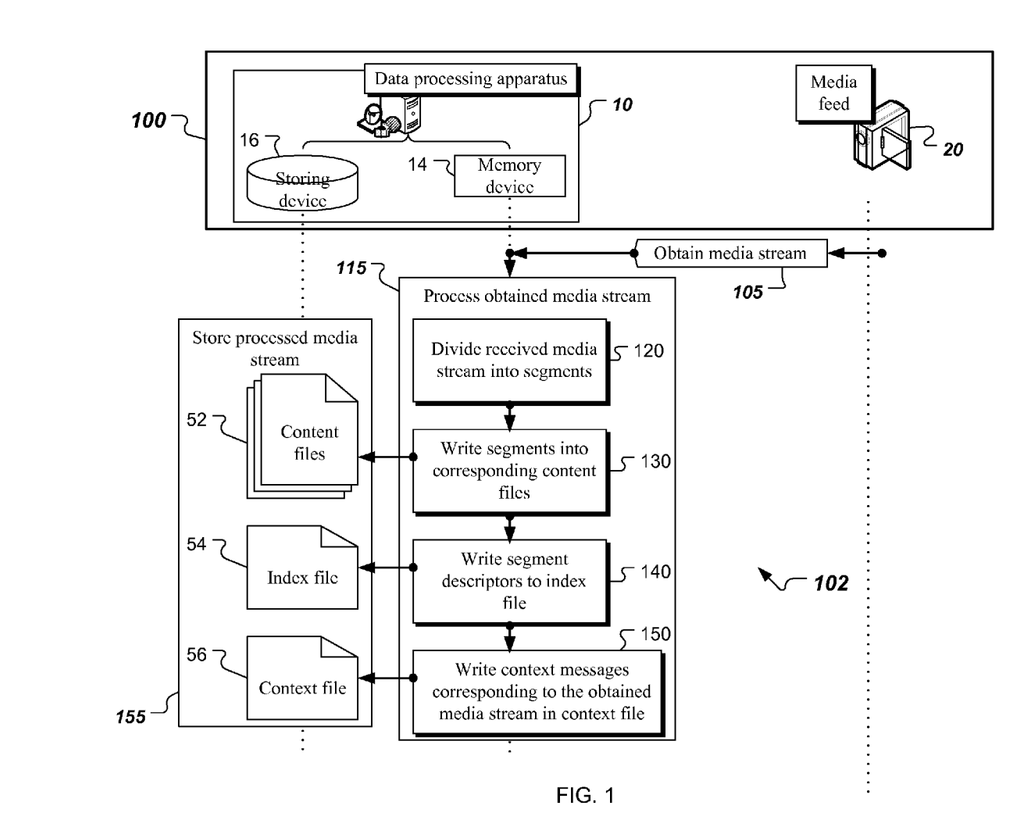
FIG. 1 shows a block diagram of an example system including a data processing apparatus in communication of a media feed, and shows a flow chart diagram of an example method implemented by the data processing apparatus for processing a live media stream obtained from the media feed.

FIG. 1 shows a block diagram of an example system 100 including a data processing apparatus in communication with a media feed. A representation of the example system 100 is included in a solid-line rectangle. For example, a data processing apparatus 10 can be a media streaming server computer configured to receive a plurality of live media streams from one or more media sources. Some of the live media streams can be received simultaneously. Further, some of the received live media streams can be received from recordings of one or more live events. The example system 100 includes one such media feed 20 in communication with the data processing apparatus 10. Media stream types that can be streamed, recorded and playback in the example system 100 include data-only, audio-only, video, and various combinations of data, audio and video in known or future formats. For example, the video can be encoded according to Recommendation ITU-T H.264 ("H.264"). The media streaming protocol over the communication channel between the data processing apparatus 10 and the media feed 20 can be any of real-time messaging protocol (RTMP), real-time messaging protocol tunneled (RTMPT), real-time messaging protocol secure (RTMPS), real-time messaging protocol encrypted (RTMPE), real-time messaging protocol tunneled encrypted (RTMPTE), and real-time media flow protocol (RTMFP).

The data processing apparatus 10 can include a memory device 14. The memory device 14 can be, for example, a random access memory (RAM) device in communication with a processor. The processor can be one or more central processor units (CPUs). The data processing apparatus 10 can be coupled with a storage device 16. In the example implementation illustrated in FIG. 1, the storage device 16 is part of the data processing apparatus 10. In some implementations, the storage device 16 can be communicatively coupled with the data processing apparatus 10 via a private or public network.

FIG. 1 also shows a flow chart diagram of an example method 102 implemented by the data processing apparatus 10 for processing a media stream obtained from the media feed 20.

A media stream can be obtained 105 in the memory device 14 of the data processing apparatus 10. In some implementations, the obtained media stream can be received from the media feed 20 in communication with the data processing apparatus. In some implementations, the obtained media stream can be rendered locally by the data processing apparatus 10 from a media streaming document stored, for example, on the storage device 16. The locally available media streaming document may be formatted according to a container format (e.g., MP4).

The obtained media stream can be processed 115 in the memory device 14, by the processor of the data processing apparatus 10, while obtaining 105 the media stream. In addition, the processing 115 of the obtained media stream can continue or start upon completion of the obtaining 105 stage of method 102.

As part of the processing 115 operation, the obtained media stream can be divided 120 into a plurality of segments. The obtained media stream can be divided into segments of a predetermined size (e.g., 256 KB, or 512 KB), or can be divided into segments of predetermined duration (e.g., 5 sec, 10 sec). Additionally, the processor can be configured to create segments of the obtained stream having either a predetermined size (e.g., 256 KB) or a predetermined duration (e.g., 5 sec), whichever predetermined threshold is attained first, while the media stream is being obtained 105 by the data processor apparatus 10.

Further as part of the processing 115 operation, the plurality of segments can be written 130 into corresponding content files 52. In some implementations, each content file 52 can include one segment. In alternative implementations, each content file 52 can include a predetermined integer number of segments. Media streams, in accordance with the protocols described herein, can include sequences of messages or individual packets of video, audio and metadata. Messages included in a given segment are written 130 sequentially in the content file 52 corresponding to the given segment.

Additionally as part of the processing 115 operation, a corresponding segment descriptor for each of the plurality of segments can be written 140 in an index file 54. The segment descriptors in the index file 54 map time offsets of the plurality of segments to address space allocated to the plurality of segments. The structure of the index file 54 and the structure of a segment descriptor are disclosed in detail below in connection with FIG. 2B.

In addition as part of the processing 115 operation, context messages can be extracted from the obtained media stream and can be written 150 in a context file 56. The context file 56 contains a serialized list of messages. The messages written into the context file 56 can supply contextual information to the media that is contained in the media stream. For example, if the obtained media stream includes video data, the context file contains codec information that a video decoder of a media player device can use at any point in the video to play.

The processed media stream, including the plurality of content files 52, the index file 54 and the context file 56, can be stored 155 in a file directory of the storage device 16, while processing 115 the media stream. The file directory associated with the processed media stream has a flat directory structure (i.e., it contains no subdirectories). Therefore, the stored plurality of content files 52, the index file 54 and the context file 56 have a given hierarchy level within the file system of the storage device 16. The structure of the file directory that stores the processed media stream is described in detail below in connection with FIG. 2A.

The obtaining 105 of the media stream, the processing 115 of the obtained media stream, and the storing 155 of the processed media stream can be performed simultaneously by the data processing apparatus 10. For example, as enough of the media stream is obtained 105, a first segment can be divided 120 from the obtained media stream. While continuing to obtain 105 the media stream, the first segment can be written 130 into a first of a plurality of content file 52. A descriptor of the first segment can be written 140 in an index file 54. The first of the plurality of content files 52 and the index 54 file can be stored 155 in a directory labeled in accordance with the media stream. As more of the media stream is obtained 105, a second segment can be divided 120. While continuing to obtain 105 the media stream, the second segment can be written 120 into a second of the plurality of content files 52. The second of the plurality of content files 52 can be stored 155 in the directory labeled in accordance with the media stream. A descriptor of the second segment can be written 140 to the index file 54. And so on. The data processing apparatus 10 can be configured to monitor for context messages within the obtained media stream. As context messages are identified within the obtained media stream, the identified context messages can be written 150 to a context file 56. The context file 56 can be stored in the directory labeled in accordance with the media stream.

Figure 2A:
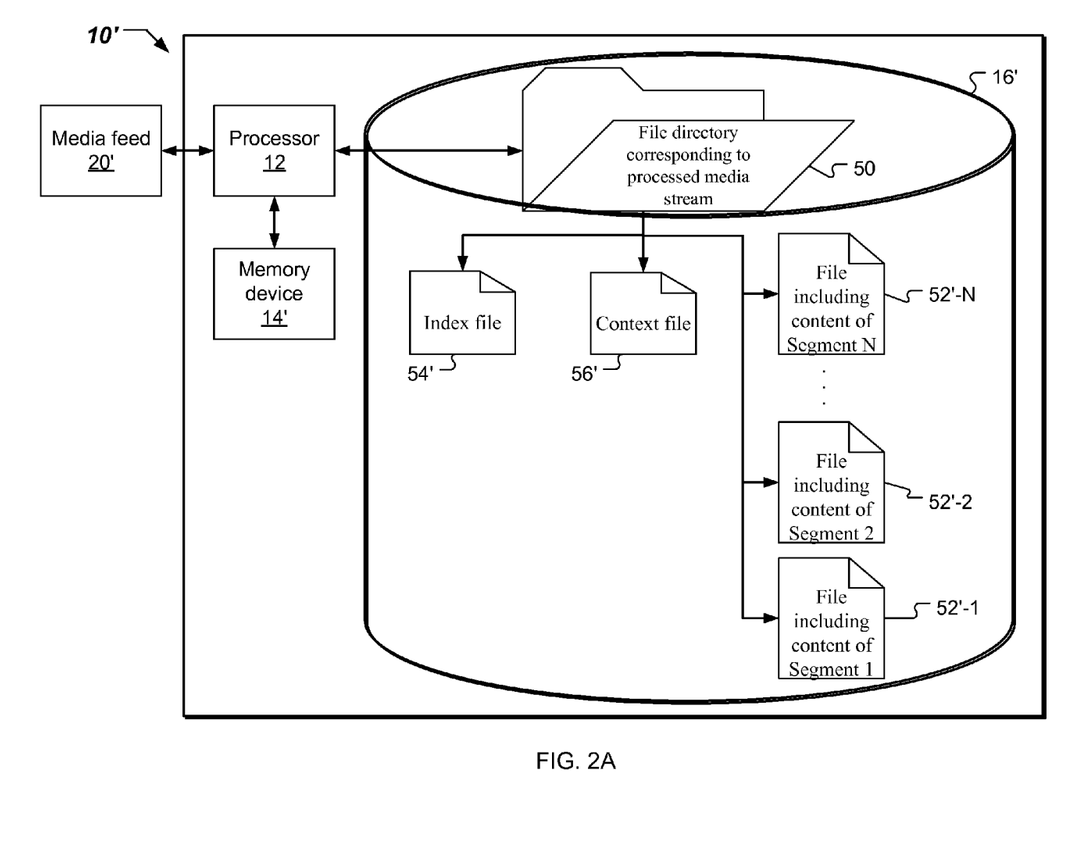
FIG. 2A shows a block diagram of an example implementation of a data processing apparatus configured to process a live media stream obtained from the media feed, and shows a hierarchical structure of a storage format for storing the processed media stream.

FIG. 2A shows a block diagram of an example implementation of a data processing apparatus 10' configured to process a media stream obtained from the media feed 20'. In some implementations, the data processing apparatus 10' and the media feed 20' can be used in system 100 described above in connection with FIG. 1. The data processing apparatus 10' includes a processor 12 that is communicatively coupled with a memory device 14' and with a storage device 16'. A media stream received by the processor 12 from the media feed 20' can be processed in accordance with method 102 described above in connection with FIG. 1. While the processing of the received media stream can be performed in the memory device 14', the processed media stream can be stored on the storage device 16'.

The storage device can have a file system including a file directory 50 associated with the processed media stream. The associated file directory 50 can (but need not) be located at the root of the file system on the storage device 16'. For example, for a received media stream labeled "foo", the associated file directory 50 can be "c:\foo". In another example, the received media stream labeled "foo" can be stored in the associated file directory 50 "c\media\foo". The file directory 50 can store the processed media stream including the plurality of content files 52'-1, 52'-2, . . . , 52'-N, . . . , the index file 54' and the context file 56'. The plurality of content files 52'-1, 52'-2, . . . , 52'-N, . . . , the index file 54' and the context file 56' are stored in a file directory 50 that has a flat directory structure.

In some implementations, each of the plurality of segments 1, 2, . . . , N, . . . is written in a separate content file 52'-1, 52'-2, . . . , 52'-N, . . . , respectively, and includes a corresponding plurality of messages. A content file 52'-$i$ corresponding to a segment "i" can be named based on an identifier of a first message in the segment "i". For example, a content file can be labeled as the "stream index" of the first message in the segment included in the segment file. Further, the content file name can be expressed in terms of a 16-digit hex number. For instance, the first message of the media stream has a stream index=0, hence the first content file 52'-1 (that includes the first segment) is named "0000000000000000". If the first segment included in the first content file 52'-1 contains 451 messages, the first message of the second segment has a stream index=(1C3)hex=451. The second file content 52'-2 (that includes the second segment) is named "00000000000001C3". If the second segment included in content file 52'-2 also contains 451 messages, the first message of the third segment has a stream index=(386)hex=902. The third file content 52'-3 (that includes the third segment) is named "0000000000000386". Thus, the media stream "foo" would be stored in a file directory 50 called "foo" that includes the files "index" 54', "context" 56', "0000000000000000" 52'-1, "00000000000001C3" 52'-2, "0000000000000386" 52'-3, . . . .

As a data processing apparatus 10' is obtaining a live media stream, e.g., according to method 102, the processor 12 is configured to monitor for an obtained media stream size/duration reaching a predetermined threshold. Once the predetermined threshold is exceeded, the processor 12 can segment a portion of the obtained media stream to generate, and then to store a content file 52'-$i$ corresponding to the segment "i". The processor 12 can repeat these steps, one segment and its corresponding content file at a time. Notably, the methods and systems disclosed in this specification enable the processing and storage of a media stream to a storage device, one content file at a time. Therefore, except for the content file 52'-$i$ that is currently being written to, all the content files 52'-1, 52'-2, . . . , 52'-$(i-1)$ that have been previously written to and stored in the file directory 50 are in a readable state, and hence readily available for streaming to clients of the data processing apparatus 10' as part of a DVR application, for instance.

Figure 2B:
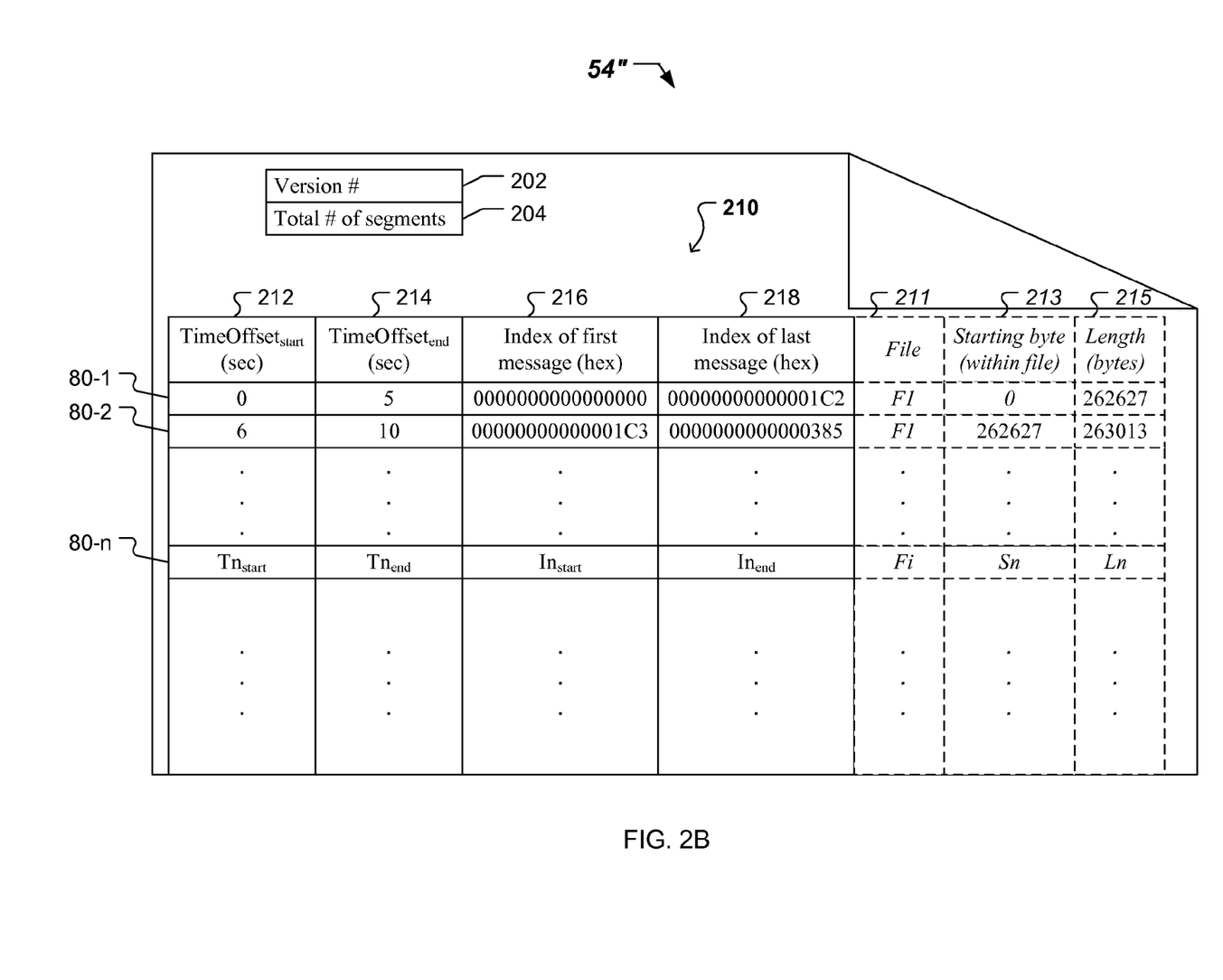
FIGS. 2B-2C show aspects of example file types that are part of the storage format for storing the processed media stream.

FIG. 2B shows elements of an example index file 54" that is part of the storage format for storing the processed media stream. The index file 54" can include a version descriptor identifier of the media stream 202. An example version descriptor identifier can be represented by a four-byte number, where the top two bytes represent the major version integer, and the bottom two bytes represent the minor version integer. For example the version description identifier 0x00010000 corresponds to version 1.0.

The index file 54" can also include a count of segments in the media stream 204. For example, if a given media stream is ten minutes long and the data processing apparatus 10 divides the given media stream into segments that are 5 seconds long, the segment count 204 is 120 segments.

The index file 54" further includes an array of segment descriptors 210. Each segment descriptor 80-1, 80-2, . . . 80-$n$ can include multiple fields, as now described in detail. A segment descriptor 80-$n$ can include a segment-start time offset 212 and a segment-end time offset 214. As discussed above, a segment includes a sequence of messages. The segment descriptor 80-$n$ can further include an index of the first message included in the segment 216. Also, the segment descriptor 80-$n$ can include an index of the last message included in the segment 218. As disclosed above, in situations when each content file corresponds to one segment, the index of the first message included in each segment can also be used as the name of the content file corresponding to the given segment. In these situations, to locate the file corresponding to a given segment "n", an application can search the folder directory 50 for a content file 52-$n$ named in accordance with the value of index 216 from the segment descriptor 80-$n$ of the given segment "n".

When more than one segment is contained in each content file, a given segment descriptor 80-$n$ can include a name of the content file 211 that contains the given segment "n". In the example index file 54" shown in FIG. 2B, each content file includes two consecutive segments (each segment contains 451 messages, in this example). For example, a first content file named "F1" includes a first segment starting with the $0^{th}$ stream-message (indexed "0"), and a second segment starting with the $451^{st}$ stream-message (indexed "1C3"). Further in this example, a second content file named "F2" includes a third segment starting with the $902^{nd}$ stream-message (indexed "386"), and a fourth segment starting with the $1353^{rd}$ stream-message (indexed "549"). And so on.

In addition, a given segment descriptor 80-$n$ can include a starting byte of the given segment's data within the content file 213, and the length of the given segment's data within the content file 215. In the example index file 54" shown in FIG. 2B, the data of the two segments included in file "F1" start with byte 0 and 262627, respectively. Moreover, the data of the two segments included in file "F1" have lengths equal to 262627 and 263013 bytes.

In some implementations, the index file 54" need not be a single file, hence segment descriptors corresponding to the plurality of segments of the media stream can be listed in a set of index files. For example, once the number of segment descriptors of a first index file reaches a predetermined value, e.g., one hundred segment descriptors, a second index file can be generated. Hence, the segment-descriptors of the subsequent predetermined number of segments can be listed in the second index file. And so on.

As a data processing apparatus 10' is obtaining a live media stream and is processing the obtained media stream, e.g., according to method 102, the processor 12 is configured to enter into the index file 54" a segment descriptor 80-$i$ of the segment "i" contained in the most recently written to and stored content file 52'-$i$. The processor is configured to append a newly entered segment descriptor 80-$i$ to the end of index file 54". The processor 12 can update the index file 54", one segment descriptor at a time. Hence, the methods and systems disclosed in this specification enable the processor to handle one content file plus an index file at a time. Therefore, except for the instant when a new segment descriptor 80-$i$ is being appended to the index file 54", the index file and the stored content files are in a readable state, and hence readily available for streaming to clients of the data processing apparatus 10' as part of a DVR application, for instance.

Figure 2C:
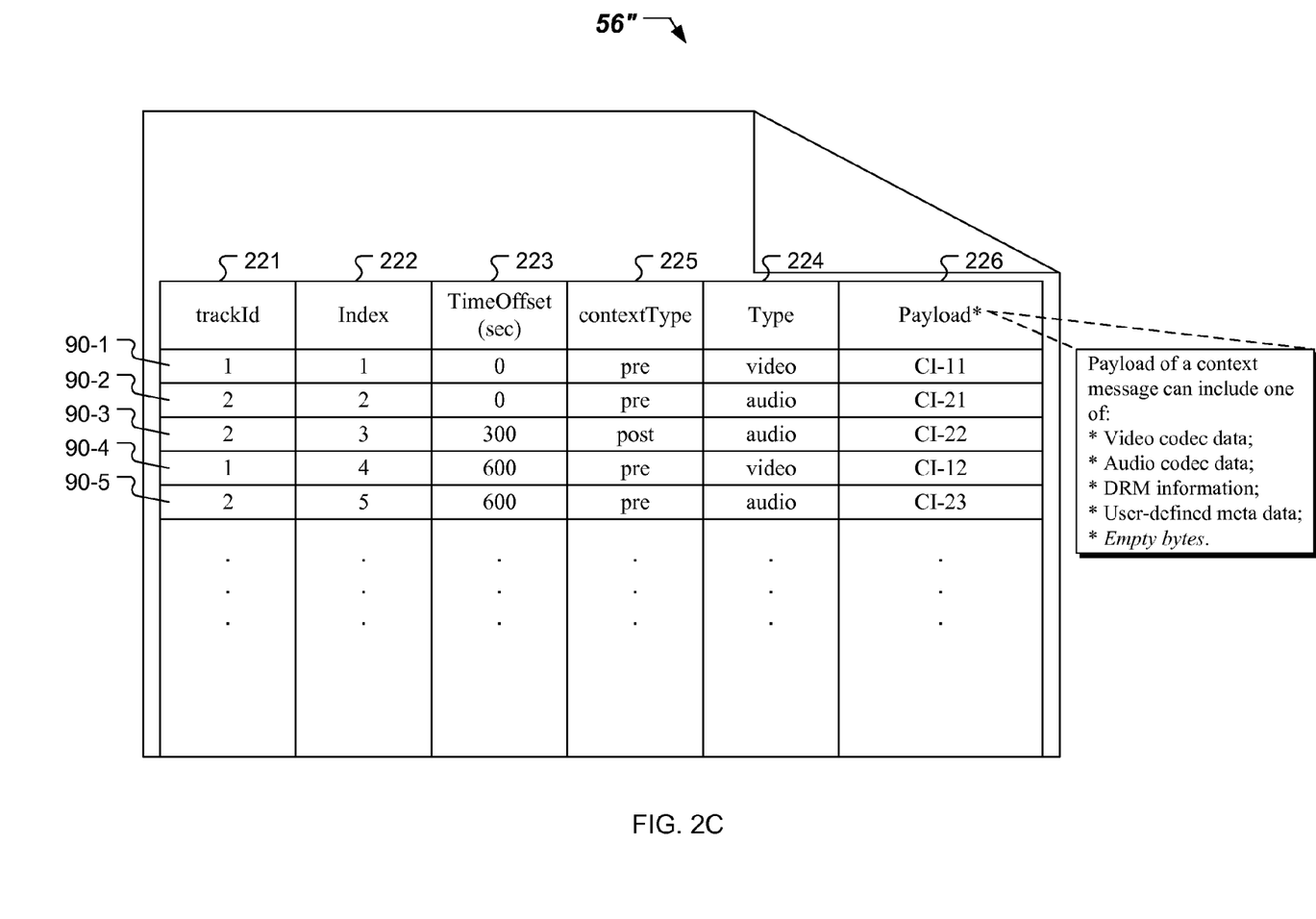

FIG. 2C shows elements of an example context file 56" that is part of the storage format for storing the processed media stream. Context messages 90-1, 90-2, . . . written in the context file 56" can include one of video codec data, audio codec data, digital rights management (DRM) information, and user-defined meta data. Video codec data can include, for example, H.264 video. The contextual information included in each of the context messages 90-1, 90-2, . . . can be found in the message payload 226.

When a media player device prepares the stored media stream for playback, (i) the context messages are grouped according to media stream tracks, and (ii) the context messages within each track are ordered by message index. The track can be a video track, or an audio track, for example. Further, a playback timestamp can be associated with one or more context messages.

A context message 90-$i$ can include an identifier of the track 221 corresponding to the context message. For the example context file 56" shown in FIG. 2C, context messages 90-1 and 90-4 have trackId="1" and correspond to a video track, while the context messages 90-2, 90-3 and 90-5 have trackId="2" and correspond to an audio track.

A context message 90-$i$ can also include an index-identifier of the context message within the context file 222. For the example context file 56" shown in FIG. 2C, the context messages 90-1, 90-4 that have indexes 1 and 4 correspond to the video track (trackID="1"), while the context messages that have indexes 2, 3 and 5 correspond to the audio track (trackID="2").

A context message 90-$i$ can further include a time offset 223 corresponding to the context message. For example, the first context messages 90-1 and 90-2 of the video and audio tracks, respectively, have zero time offsets. The second context message 90-4 of the video track has a time offset of 600 seconds. The second and third context messages 90-3, 90-5 of the audio track have time offsets of 300 seconds and 600 seconds, respectively.

A context message 90-$i$ can additionally include a context type 225 to indicate whether the context message 90-$i$ corresponds to a contextual period starting or ending with the time offset 223. For example, the information included in context message 90-2 corresponds to the contextual period starting at the beginning of the media stream, as indicated by the "pre" context-type 225 and the zero time offset 223. The information included in example context message 90-3 corresponds to the contextual period during the first 5 minutes of the media stream, as indicated by the "post" context-type 225 and the 300-sec time offset 223.

A context message 90-$i$ can include a message type 224. Message type 224 can be audio, video, etc. However, a context message that corresponds to a video track (trackID="1") can be of DRM-type 224. The foregoing context message may include contextual instructions relating to rights and permissions for the media of the video track.

As described above, a context message's payload 226 can include multiple types of data. However, there may be situations when a portion of, or the entire payload 226 is left empty, or equivalently filled with empty-bytes. For example, a header/ender pair of H.264 context messages can be implemented to contain an ender context message that has an empty message payload 266. Hence, the payload 226 can contain one of video codec data, audio codec data, digital rights management data, user-defined meta data, and empty-bytes.

In some implementations, the context file 56" need not be a single file, hence context messages corresponding to the media stream can be listed in a set of context files. For example, once the number of context messages being written to a first context file reaches a predetermined value, e.g., one hundred context messages, a second context file can be generated. Hence, the next predetermined number of context messages can be listed in the second context file. And so on.

Finally, the context file 56" illustrated schematically in FIG. 2C is a serialized version of context messages having the above described data structure. As a data processing apparatus is obtaining a live media stream, e.g., according to method 102, the processor 12 is configured to monitor for, and to capture context messages in the obtained media stream. As the processor detects and captures such context messages 90-1, 90-2, . . . , in the obtained media stream, the processor can write the series of context messages 90-1, 90-2, . . . to the context file 56 stored on the memory device 16'. The processor is configured to append a newly captured context message to the end of context file 56.

The format described in connection with FIGS. 2A-2C for storing the processed media stream to a storage device 16' enable a data processing apparatus 10' to process and to store a media stream to a storage device 16', one content file plus an index file plus a context file at a time. Based on the above characteristic, the methods and systems described in this specification can be used to implement a digital video recording (DVR) application. As detailed below in connection with FIG. 3, the data processing apparatus 10 can stream the stored media stream to one or more media player devices while obtaining the media stream from the media feed, and while processing the obtained media stream.

Figure 3:
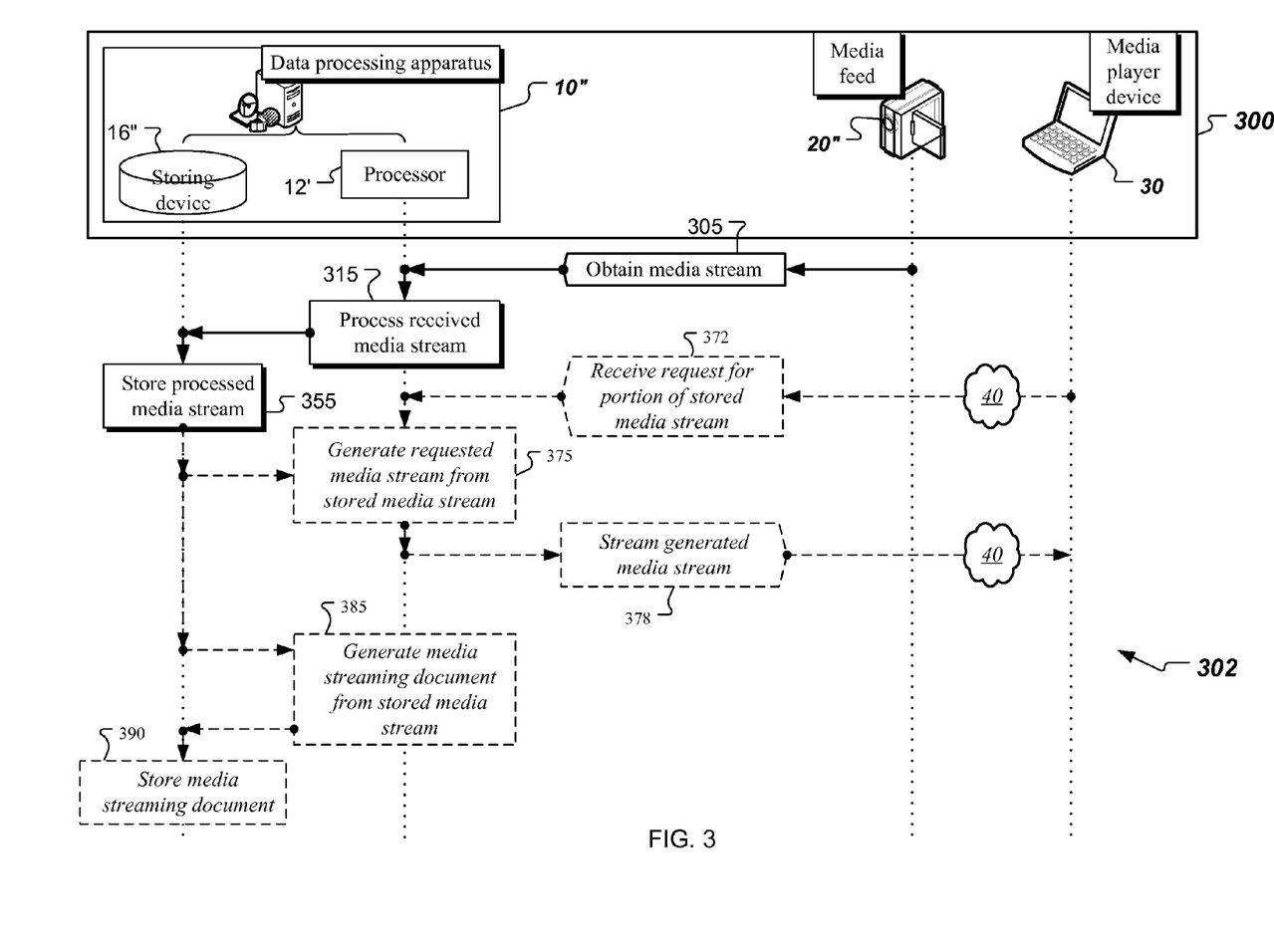
FIG. 3 shows a block diagram of an example system including a data processing apparatus in communication of a media feed and a media player device, and shows a flow chart diagram of an example method implemented by the data processing apparatus for processing a media stream obtained from the media feed and for simultaneously outputting the stored media stream, either by converting the stored media streaming document to another storage format, or by streaming the stored media stream to the media player device.

FIG. 3 shows a block diagram of an example system 300 including a data processing apparatus 10" in communication with a media feed 20" and a media player device 30. A representation of the example system 300 is included in a solid-line rectangle. The system 300 can be configured to implement an online DVR application. The communication channels between the data processing apparatus 10" and the media feed 20" and the media player device 30 can support different media stream types. Some types of media streams that can be recorded and played back in the example systems 100 and 300 include data-only, audio-only, H.264 video, and various combinations of data, audio and video in known or future formats. The media streaming protocol over the communication channel between the data processing apparatus 10 and the media feed 20, and between the data processing apparatus 10" and the media player device 30 can be any of RTMP, RTMPT, RTMPS, RTMPE, RTMPTE, and RTMFP. The communication channel between the data processing apparatus 10" and the media player device 30 can be a private or public data network, e.g., the Internet 40. The data processing apparatus further includes a processor 12' in communication a storage device 16".

FIG. 3 also shows a flow chart diagram of an example method 302 implemented by the data processing apparatus 10" for processing a media stream obtained from the media feed 20" and for simultaneously outputting the stored media stream. The outputting can be performed either by converting the stored media stream to a media document in accordance with a container storage format, or by streaming the stored media stream to the media player device 30.

The media stream can be obtained 305 from a media feed 20" different from the data processing apparatus 10" and can represent the live video input of an online DVR application implemented on system 300. The obtained media stream can be processed 315 by the processor 12' and stored 355 on the storing device 16", for example, in accordance with method 102 described above in connection with FIG. 1. The stored media stream can be output in multiple ways. The outputting of the stored media stream can occur while obtaining 305 and processing 315 the media stream.

In some implementations, a request for at least a portion of the live media stream can be received 372 from a media player device 30. The media player device 30 is different from the data processing apparatus 10" and from the media feed 20". The requested media stream can be generated 375 from the stored media stream. The storage format disclosed in this specification is referred to as raw. For instance, the code listed below records a live stream into a raw stream:

```
s = Stream.get("raw:recordedStream");
s.record( );
s.play("livestream", -1, -1);
```

The generated media stream can be streamed 378 to the media rendering device 30.

The received request 372 can be for streaming the stored media stream starting from a given one of the plurality of segments of the media stream. Upon receipt of such request, the processor 12' can identify a content file that corresponds to the given one of the plurality of segments by inspecting the index file. Additionally, the processor 12' can select, from the context file, context messages relating to the requested media stream. Further, the data processing apparatus 10" can generate 375 the requested media stream from the identified content file that corresponds to the given one of the plurality of segments of the media stream, and in accordance with the selected context messages. For example, part of generating 375 the requested media stream can include playing the segment (or segments) stored in the identified content file on a media player operated at the data processing apparatus 10". Furthermore, the generated media stream can be streamed 378 to the media player device 30.

In some instances, the received request 372 may be for streaming the stored media stream from a given seek time. Upon receipt of the given seek time in such instances, the processor 12' can identify, in the index file, a time offset range corresponding to the received seek time. Once the time offset range that includes the received seek time has been identified in the index file, the processor 12' can select a segment corresponding to the seek time, based on the identified time offset range. Finally, the processor 12' can identify, from the index file, the content file that corresponds to the selected segment.

In some instances, the received request 372 may be for streaming a next segment during play-through of the media stream. Upon receipt of a play-through request in such instances, the processor 12' can select the next-segment to stream to the media player device 30. The next-segment can be selected by the processor 12' by identifying, in the index file, the next-segment's first-message index as a previously-streamed-segment's last-message index plus one. If each content file includes one segment, the processor 12' can select a content file corresponding to the next-segment based on the identified next-segment's first-message index. Alternatively, if the next-segment is stored in a content file that includes one or more other segments, the content file corresponding to the next-segment can be selected by name from the segment-descriptor of the next-segment.

In some implementations, a media streaming document in accordance with a container format can be generated 385 from the stored media stream. The generated media streaming document can be stored 390 to the storage device 16". The generation 385 of the media streaming document can be performed automatically, for example, either during the live recording of the received media stream, or upon completion of the live recording. Additionally, the generation 385 of the media streaming document can be performed upon receipt of an instruction from a user of the data processing apparatus 10".

The subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   obtaining a media stream in a memory device of the data processing apparatus;
   processing the obtained media stream, wherein the processing is performed in the memory device while obtaining the media stream and includes:
     dividing the obtained media stream into a plurality of segments;
     sequentially writing the plurality of segments into corresponding content files, wherein all of the content files are in a readable state during processing of the obtained media stream, except for the content file that is being written to at a given time;
     writing a corresponding segment descriptor for each of the plurality of segments in an index file to map time offsets of the plurality of segments to address space allocated to the plurality of segments; and
     writing context messages corresponding to the obtained media stream in a context file; and
   storing the processed media stream including the content files, the index file and the context file in a file directory of a storage device coupled with the data processing apparatus, wherein the storing is performed while processing the media stream, wherein the file directory corresponds to the processed media stream, and wherein the stored content files, the index file and the context file each share a common hierarchy level within the file directory of the storage device.

2. The method of claim 1, wherein each of the plurality of segments is written in a separate content file, and includes a corresponding plurality of messages, the method further comprising:
   naming the separate content file corresponding to a segment based on an identifier of a first message in the segment.

3. The method of claim 1, wherein writing the plurality of segments in corresponding content files comprises:
   writing a predetermined number of corresponding segments in each of the content files.

4. The method of claim 1, wherein obtaining the media stream comprises:
   receiving the media stream from a media feed different from the data processing apparatus, the method further comprising:
   outputting the stored media stream.

5. The method of claim 4, wherein outputting the stored media stream occurs while obtaining and processing the media stream, and comprises:
   receiving, from a media rendering device, a request for at least a portion of the obtained media stream, wherein the media rendering device is different from the data processing apparatus and from the media feed;
   generating the requested media stream from the processed media stream; and
   streaming the generated media stream to the media rendering device.

6. The method of claim 4, wherein outputting the stored media stream comprises:
   converting the stored media stream to a media streaming document in accordance with a container format; and
   storing the converted media streaming document to the storage device.

7. The method of claim 1, wherein
   the media stream is obtained as a sequence of messages, each of the messages being an associated packet of video, audio or meta data associated with the media stream, and
   each of the plurality of segments into which the media stream is divided includes a corresponding portion of the sequence of messages, such that the segments have a predetermined size or a predetermined duration.

8. The method of claim 7, wherein the predetermined size is one of 256 KB or 512 KB, and the predetermined duration is one of 5 sec or 10 sec.

9. The method of claim 1, wherein each of the plurality of segments has either a predetermined size or a predetermined duration, depending on whichever predetermined threshold is attained first while the media stream is obtained by the data processing apparatus.

10. A system comprising:
    a media player device; and
    a data processing apparatus communicatively coupled with a storage device and with the media player device, wherein the data processing apparatus comprises a physical processor and a memory device, and wherein the processor is configured to perform operations comprising:
      obtaining a video stream in the memory device;
      processing the obtained video stream, wherein the processing is performed in the memory device while obtaining the video stream and includes:
        dividing the obtained video stream into a plurality of segments;
        sequentially writing the plurality of segments into corresponding content files, wherein all of the content files are in a readable state during processing of the obtained video stream, except for the content file that is being written to at a given time;
        writing a corresponding segment descriptor for each of the plurality of segments in an index file to map time offsets of the plurality of segments to address space allocated to the plurality of segments; and
        writing context messages corresponding to the obtained video stream in a context file; and
      storing the processed video stream including the content files, the index file and the context file in a file directory of the storage device, wherein the storing is performed while processing the video stream, wherein the file directory has a common hierarchy level that contains the content files, the index file and the context file and that corresponds to the processed video stream.

11. The system of claim 10, wherein the data processing apparatus comprises a server operable to interact with the media player device through a data communication network, and the media player device is operable to interact with the server as a client.

12. The system of claim 11, wherein the media player device comprises a personal computer running a video player.

13. The system of claim 11, wherein the obtaining of the video stream comprises the processor receiving the video stream from a media feed, and wherein the processor is further configured to perform outputting the stored video stream.

14. The system of claim 13, wherein the outputting of the stored video stream is performed by the processor while obtaining and processing the video stream, and wherein the processor is further configured to perform operations comprising:
   receiving, from the media player device, a request for at least a portion of the obtained video stream;
   generating the requested video stream from the stored video stream; and
   streaming the generated video stream to the media player device.

15. The system of claim 11, wherein
   the video stream is obtained as a sequence of messages, each of the sequence of messages being an associated packet of video, audio or meta data associated with the video stream, and
   each of the plurality of segments into which the video stream is divided includes a corresponding portion of the sequence of messages, such that the segments have a predetermined size or a predetermined duration.

16. The system of claim 15, wherein the predetermined size is one of 256 KB or 512 KB, and the predetermined duration is one of 5 sec or 10 sec.

17. The system of claim 10, wherein each of the plurality of segments has either a predetermined size or a predetermined duration, depending on whichever predetermined threshold is attained first while the video stream is obtained in the memory device.

* * * * *